Patented May 14, 1946

2,400,095

UNITED STATES PATENT OFFICE 2,400,095

THIOCYANO SUBSTITUTED CARBOXYLIC ACID ESTERS

Joseph N. Borglin, Wilmington, Del., assignor to Hercules Powder Company, Wilmington, Del., a corporation of Delaware No Drawing. Application May 23, 1941,
Serial No. 394,879

2 Claims. (Cl. 260—345)

This invention relates to a series of new compounds, more particularly to esters of heterocyclic alcohols and certain carboxylic acids. It also relates to a method for preparing the compounds.

In accordance with this invention esters of heterocyclic organic alcohols, particularly those containing oxygen, sulfur or nitrogen in the position of a cyclic atom, and organic carboxylic acids substituted with a thiocyano, selenocyano or tellurocyano group are provided by a process which comprises reacting a heterocyclic alcohol with a halogen substituted esterifying agent to produce an ester of a halogen substituted carboxylic acid and reacting this ester with a metal thiocyanate, selenocyanate or tellurocyanate which is reactive therewith under the conditions employed. The compounds formed by this method have the formula ROOCR'XCN in which R is the radical of a heterocyclic alcohol, in which R' is an organic radical (i. e., an aliphatic, alicyclic, heterocyclic, or aromatic radical), and in which X is sulfur, tellurium or selenium.

The organic heterocyclic alcohol which is utilized in the method according to this invention will comprise a cyclic structure consisting of carbon atoms and one or more atoms of other elements and will carry an esterifyable hydroxyl group. Heterocyclic alcohols with oxygen, sulfur or nitrogen cyclic atoms are particularly useful. The following alcohols are examples of suitable materials: furfuryl alcohol, tetrahydrofurfuryl alcohol, methylfurfuryl alcohol, tetrahydromethylfurfuryl alcohol, monoethyloldioxane, dimethyloldioxane, methylolmorpholine, beta-methylolcoumarone, thienyl alcohol, beta-methylolthiophene, alpha-methylol rhodim tetrahydropyrrole alcohol, pyrrole alcohol, isatin, beta-methylolpyrazole and the like.

Suitable halogen substituted acylating or esterification agents which are utilized are the halogen substituted carboxylic acids such as, for example, monochloroacetic acid, dichloroacetic acid, trichloroacetic acid, alpha-chloropropionic acid, beta-chloropropionic acid, dichloropropionic acid, alpha- beta- or gamma-chlorobutyric acid, dichlorobutyric acid, chlorobenzoic acid, chlorophthalic acid, chlorolauric acid, chloromyristic acid, chlorostearic acid, chloroleic acid, chloroicinoleic acid, chloromalonic acid, chloronaphthenic acid, chlorofluoric acid and the corresponding bromine, iodine and fluorine substituted acids. These may be mixed if desired. Acid anhydrides of the halogen substituted carboxylic acid may be used as esterification agents instead of the acids themselves. Acid halides, particularly acid chlorides and acid bromides of halogen substituted organic carboxylic acid such as those named are also suitable as esterification agents. However, when using acid halides of this nature, it is preferable to include in the reaction mixture an acid acceptor, for example, pyridine or other tertiary amine to take up hydrochloric acid, hydrobromic acid, etc., formed in the reaction.

The metal thiocyanate which I use may be any metal thiocyanate which is reactive under the conditions employed. To be reactive under these conditions, it must be partially or completely soluble in the reaction mixture utilized. Suitable metal thiocyanates are, for example, lithium thiocyanate, sodium thiocyanate, calcium thiocyanate, magnesium thiocyanate, potassium thiocyanate, ammonium thiocyanate, and the like. When it is desired to make a selenocyanoacylate, the metal selenocyanate I may use may be, for example, lithium selenocyanate, sodium selenocyanate, calcium selenocyanate, potassium selenocyanate, ammonium selenocyanate, etc., and similarly where a tellurocyanoacylate is to be prepared I may use sodium tellurocyanate, lithium tellurocyanate, potassium tellurocyanate, calcium tellurocyanate, ammonium tellurocyanate, etc.

The reaction in accordance with this invention will desirably be carried out in two steps. In the first step, the heterocyclic alcohol is reacted with the halogen substituted esterifying agent to form the corresponding halogen substituted ester. Preferably at this point the ester is recovered from the reaction mixture at least to the extent of removing acidic materials from the ester. The second stage of the reaction comprises treating the halogen substituted carboxylic acid ester with the metal thiocyanate, selenocyanate or tellurocyanate as the case may be.

Both steps may be carried out in an inert solvent medium such as benzene, toluene, hexane, iso-octane, carbon tetrachloride, and the like. In most cases, it will be desirable to utilize a reaction solvent medium and to carry out the reaction at the boiling point of the reaction mixture under reflux utilizing the reaction solvent to maintain the temperature at the desired level. Preferably, the first-stage reaction will be carried out in an inert atmosphere such as that provided by carbon dioxide, hydrogen, nitrogen, helium, etc., in order that the lightest possible color may be obtained in the product.

The two stages may be conducted under widely varying temperatures, i. e., from about 0 to about 200° C. Where a halogen substituted carboxylic acid is utilized in the first stage the temperature will preferably be maintained between about 70° C. and about 120° C. during the reaction. Toluene, benzene and the like may be utilized in this temperature range to provide azeotropic distillation to remove water formed by the reaction. Where acid anhydrides are utilized in the first step, temperatures between 50° C. and about 150° C. are preferred. In the case of acid halides, the preferred temperature is between about 20° C. and about 150° C.

An esterification catalyst may be included in the first-stage reaction mixture if desired. Small quantities of sulfuric acid, perchloric acid, zinc chloride and the like are suitable, or such basic catalysts as sodium acetate, sodium propionate, pyridine, aniline hydrochloride, etc., may be utilized. The presence of pyridine is particularly valuable in those cases where acid halides are utilized. Where the heterocyclic alcohol utilized has some tendency to polymerize, as is the case with such materials as furfuryl alcohol and pyrrole alcohol, it is desirable to utilize only such catalysts as have no polymerizing tendency upon the alcohol. Under conditions where polymerizing alcohols are utilized it is desirable to use an acid anhydride as the esterification agent in the presence of a mildly basic catalyst such as sodium acetate, pyridine and the like, and preferably a medium such as pyridine will be utilized.

After the first-stage reaction has been completed, which will usually be between about 2 and about 24 hours, depending upon the temperature utilized, the ester formed may be recovered from the reaction mixture. In cases where the ester formed is quite soluble in a solvent which is immiscible with water, i. e., benzene, hexane, butyl acetate and the like, such a solvent may be added and the reaction mixture washed with water to remove acidic material. Volatile material may then be removed by vacuum distillation. However, where the product is freely soluble in water, vacuum distillation of the reaction mixture is preferred to separate its components.

The halogen substituted carboxylic acid ester is then reacted with the metal thiocyanate, selenocyanate, or tellurocyanate, as the case may be to form the corresponding thiocyano, selenocyano or tellurocyano substituted ester. This reaction is preferably carried out in a mutual solvent such as ethyl alcohol, methyl alcohol isopropyl alcohol, ethyl acetate and the like. Preferably, the reaction will be conducted at a temperature between about 60° C. and the reflux temperature of the reaction mixture. The reaction usually requires about an hour at a temperature such as 80° C. to go to completion. The heterocyclic alcohol, thiocyanoacylate or similar ester may then be recovered from the reaction mixture by distillation to remove volatile material and filtration from crystalline salt present. Where the product is quite soluble in a water-immiscible solvent, such solvent may be added in excess and the solution washed with water to remove all salt. Vacuum distillation of the solution so obtained yields the desired ester as a residue. The product may be dried by heating under a vacuum.

The method in accordance with this invention will be further illustrated by the examples which follow. All parts and percentages are by weight unless otherwise specified.

*Example 1*

Four hundred parts of tetrahydrofurfuryl alcohol were reacted with 300 parts of chloroacetic acid at a temperature of 120° C. for 18 hours. The resulting reaction mixture was then vacuum distilled. The first fraction distilling over (25°C.–108° C.) consisted of unreacted alcohol, water and decomposition products and the fraction was discarded. The desired material distilled at 108–130° C. and comprised 475 parts of a water-white liquid with a combined chlorine content of 18.9%. This product consisted essentially of tetrahydrofurfuryl chloroacetate.

Four hundred fifty parts of the tetrahydrofurfuryl chloroacetate were mixed with 240 parts of sodium thiocyanate and 500 parts of isopropyl alcohol and the mixture was held at the reflux temperature (78° C.) for 1 hour. The resulting reaction product was cooled and filtered. The filtrate was heated to 60° C. under a vacuum. The product obtained was 410 parts of a dark red liquid having a combined sulfur content of 14.8% and consisting essentially of tetrahydrofurfuryl thiocyanoacetate.

*Example 2*

One hundred fifty parts of thienyl alcohol were reacted with 140 parts of chloroacetic acid at 120° C. for 8 hours. The resulting reaction mixture was vacuum distilled, the first fraction representing undesired volatile material and the second fraction representing the desired thienyl chloroacetate. The second fraction distilled had a chlorine content of 16.8%.

One hundred thirty parts of thienyl chloroacetate were reacted with 120 parts of sodium thiocyanate in 250 parts of isopropyl alcohol for one hour at the reflux temperature of the mixture. The resulting material was chilled and filtered to remove crystalline salt and the filtrate then heated under vacuum to remove water and volatile solvent to obtain the thienyl thiocyanoacetate.

*Example 3*

One hundred parts of monomethyloltetrahydropyrrole and 94 parts of chloroacetic acid were reacted in toluene under azeotropic refluxing with removal of water in the distillate for 10 hours. The resulting product was then water washed and the toluene removed from the resulting toluene solution by heating under vacuum. Monomethyloltetrahydropyrrole chloroacetate analyzing 17% chlorine was obtained in this manner.

Ninety parts of the chloroacetate ester were reacted with 70 parts of sodium thiocyanate in 100 parts of isopropyl alcohol for one hour at the reflux temperature of the mixture. The resulting mixture was diluted with benzene, washed with water and the volatile materials and moisture then removed by heating the product under vacuum to obtain the monomethyloltetrahydropyrrole thiocyanoacetate.

*Example 4*

Four hundred parts of tetrahydrofurfuryl alcohol were reacted with 450 parts of bromoacetic acid at 130° C. for twelve hours under a blanket of carbon dioxide. Volatile materials were then distilled off under a high vacuum, the distillation being continued and the distillate being discarded until no more acid distilled. The bromoacetic ester was then vacuum distilled from the residue. It had a bromine content of 29.9%.

Two hundred parts of the bromoacetic ester were refluxed with isopropyl alcohol and potassium thiocyanate for 1.5 hours. The resulting product was chilled and filtered and the filtrate heated under vacuum at 60° C. The resulting dark red liquid had a sulfur content of 14.2% and consisted essentially of tetrahydrofurfuryl thiocyanoacetate.

The products in accordance with this invention are useful as intermediates and in pharmacological application. The compounds are for the most part quite soluble or partly soluble in water and they are very readily dispersed in water where they are not freely soluble. The property of free water solubility or dispersibility is coupled with very low volatility in the product.

It will be understood that the details and examples hereinbefore set forth are illustrative only and that the invention as broadly described and claimed is in no way limited thereby.

What I claim and desire to protect by Letters Patent is:

1. Tetrahydrofurfuryl thiocyanoacetate having the formula:

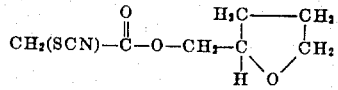

2. A tetrahydrofurfuryl thiocyanoacylate.

JOSEPH N. BORGLIN.